United States Patent
Meng et al.

(10) Patent No.: US 11,127,122 B2
(45) Date of Patent: Sep. 21, 2021

(54) IMAGE ENHANCEMENT METHOD AND SYSTEM

(71) Applicant: Suzhou Keda Technology Co., Ltd., Suzhou (CN)

(72) Inventors: Guoqing Meng, Suzhou (CN); Fengfeng Tang, Suzhou (CN); Yong Zhang, Suzhou (CN); Lijun Cao, Suzhou (CN); Weidong Chen, Suzhou (CN)

(*) Notice: Subject to any disclaimer, the term of this patent is extended or adjusted under 35 U.S.C. 154(b) by 0 days.

(21) Appl. No.: 16/872,532

(22) Filed: May 12, 2020

(65) Prior Publication Data

US 2020/0273154 A1 Aug. 27, 2020

Related U.S. Application Data

(63) Continuation of application No. PCT/CN2018/110702, filed on Oct. 17, 2018.

(30) Foreign Application Priority Data

Nov. 13, 2017 (CN) .......................... 201711116454.5

(51) Int. Cl.
 *G06T 5/00* (2006.01)
 *G06T 5/20* (2006.01)

(52) U.S. Cl.
 CPC ................ *G06T 5/008* (2013.01); *G06T 5/20* (2013.01); *G06T 2207/20012* (2013.01)

(58) Field of Classification Search
 None
 See application file for complete search history.

(56) References Cited

U.S. PATENT DOCUMENTS

| 8,319,853 B2 * | 11/2012 | Fukuda | H04N 9/77 348/222.1 |
| 8,649,629 B2 * | 2/2014 | Lim | H04N 5/243 382/274 |

(Continued)

FOREIGN PATENT DOCUMENTS

| CN | 102509272 A | | 6/2012 |
| CN | 102789635 A | * | 11/2012 |
| CN | 107730475 A | | 2/2018 |
| EP | 1918871 A2 | * | 8/2008 |

OTHER PUBLICATIONS

Tektonidis, Marco, and David Monnin. "Color consistency and local contrast enhancement for a mobile image-based change detection system." Journal of Imaging 3.3 (2017): 35. (Year: 2017).*

(Continued)

*Primary Examiner* — Andrae S Allison
(74) *Attorney, Agent, or Firm* — Verrill Dana, LLP

(57) ABSTRACT

The present application provides an image enhancement method and system, the method includes acquiring an input brightness value, and computing a log average value of the input brightness value; processing the input image based on a Retinex image enhancement algorithm to obtain a first brightness gain value; computing a brightness gain control factor according to the log average value of the input brightness value; computing a second brightness gain value according to the brightness gain control factor and the first brightness gain value; and obtaining an output image by enhancing the input image according to the second brightness gain value. The present application uses a Retinex image enhancement algorithm to enhance the input image, and by using the brightness gain control factor, when the image has low brightness, the first brightness gain value is compressed, and when the image has high brightness, the first brightness gain value is compressed slightly.

11 Claims, 3 Drawing Sheets

(56) References Cited

U.S. PATENT DOCUMENTS

| | | | |
|---|---|---|---|
| 8,781,248 B2 | 7/2014 | Wang et al. | |
| 9,092,838 B2* | 7/2015 | Barkan | H04N 5/2355 |
| 9,129,403 B2* | 9/2015 | Finlayson | G06T 5/40 |
| 9,412,155 B2* | 8/2016 | Steiner | G06T 5/007 |
| 9,549,128 B2* | 1/2017 | Barkan | H04N 5/265 |
| 2005/0030415 A1* | 2/2005 | Takizawa | H04N 5/2351 |
| | | | 348/362 |
| 2007/0279500 A1* | 12/2007 | Castorina | G06T 5/20 |
| | | | 348/254 |
| 2008/0055681 A1* | 3/2008 | Li | H04N 9/68 |
| | | | 358/520 |
| 2009/0041376 A1* | 2/2009 | Carletta | G06T 5/50 |
| | | | 382/274 |
| 2009/0074317 A1* | 3/2009 | Lee | G06T 5/20 |
| | | | 382/256 |
| 2009/0322952 A1* | 12/2009 | Li | H04N 9/68 |
| | | | 348/645 |
| 2010/0061653 A1* | 3/2010 | Huang | G06T 5/40 |
| | | | 382/274 |
| 2013/0278830 A1* | 10/2013 | Noutoshi | H04N 5/21 |
| | | | 348/607 |
| 2014/0072218 A1* | 3/2014 | Kim | H04N 1/4074 |
| | | | 382/170 |
| 2018/0047141 A1* | 2/2018 | El Mezeni | G06T 3/40 |

OTHER PUBLICATIONS

Rahman, Zia-ur, Daniel J. Jobson, and Glenn A. Woodell. "Retinex processing for automatic image enhancement." Journal of Electronic imaging 13.1 (2004): 100-110. (Year: 2004).*

Lee, Chang-Hsing, Cheng-Chang Lien, and Chin-Chuan Han. "Color image enhancement using multiscale retinex and image fusion techniques." International Journal of Computer, Electrical, Automation, Control and Information Engineering 8.10 (2014): 1791-1797. (Year: 2014).*

Q. Fu, C. Jung and K. Xu, "Retinex-Based Perceptual Contrast Enhancement in Images Using Luminance Adaptation," in IEEE Access, vol. 6, p. 61277-61286, 2018, doi: 10.1109/ACCESS.2018.2870638. (Year: 2018).*

Simon, Neethu, and Ajay Kumar. "Contrast enhancement of color images using improved Retinex method." International Journal of Research in Engineering and Technology 3.11 (2014): 279-85. (Year: 2014).*

International Search Report and Written Opinion, received in international patent application No. PCT/CN2018/110702, dated Jan. 4, 2019, 13 pages, including English translations.

First Office Action issued in priority CN application 201711116454.5—dated May 22, 2019—with English translation, 6 pages.

* cited by examiner

IMAGE ENHANCEMENT METHOD AND SYSTEM

CROSS REFERENCE TO RELATED APPLICATIONS

This application is a continuation of International Application No. PCT/CN2018/110702, filed on Oct. 17, 2018, which is based upon and claims priority to Chinese Patent Application No. 201711116454.5, filed on Nov. 13, 2017, the entire contents of which are incorporated herein by reference.

TECHNICAL FIELD

The present application relates to the field of digital image processing technology, and particularly relates to an image enhancement method and system based on a Retinex image enhancement algorithm.

BACKGROUND

A video capture process is affected by many factors, such as insufficient lighting and low brightness at night or in low-light shooting conditions; light blocking makes part of the formed image brighter and the other part darker, causing uneven lighting; reflection or strong light sources render the acquired image brightness distribution uneven, and highlight areas with blurred details. Insufficient or uneven lighting will cause poor display effect of the image, thus does not satisfy people's visual perception. On the other hand, for subsequent image processing such as image recognition and target tracking, it will impose a serious impact, thus, image enhancement technology is needed to enhance images subjected to uneven lighting to improve the quality.

The image enhancement technology refers to using signal processing techniques to enhance local or overall features according to the image quality and different applications. For image s with uneven lighting, the commonly used image enhancement algorithms are: grey transform method, homomorphic filtering method, wavelet transform enhancement, an image enhancement algorithm based on Retinex theory etc., among which the Retinex image enhancement algorithm has the advantages of color fidelity, detail enhancement and dynamic range compression, and is often used in combination with other algorithms to achieve better enhancement effects. Multi-scale Retinex (MSR, Multi-Scale Retinex) and MSR with color restoration (MSRCR, Multi-Scales Retinex with Color Restoration) are two methods widely used. However, the two algorithms have poor effect for image processing with multiple light sources, and are prone to generate halo artifacts. For darker images, the output image is over bright and does not match to real scene although it looks clearer. Particularly, when an image has poor quality, the output image is accompanied by noise and may generate blocking effects, thereby causing worse effect.

SUMMARY

With respect to the problems in the prior art, the objective of the present application is to provide an image enhancement method and system to control the output brightness, so that the output image can be both improved and consistent with the real environment.

An image enhancement method provided by embodiments of the present application comprises the following steps:

acquiring an input brightness value of each pixel of an input image, and computing a log average value of the input brightness values;

processing the input image based on a Retinex image enhancement algorithm, to obtain a first brightness gain value of each pixel;

computing a brightness gain control factor, which is positively correlated with the log average value of the input brightness values, according to the log average value of the input brightness values;

computing a second brightness gain value of each pixel according to the brightness gain control factor and the first brightness gain value; and;

obtaining an output image by enhancing each pixel of the input image according to the second brightness gain value.

The present application embodiment further provides an image enhancement system, for realizing the image enhancement method, the system comprises:

an input brightness value acquisition module, for acquiring the input brightness value of each pixel of an input image;

a brightness gain value computation module, for computing a log average value of the input brightness values; and processing the input image based on a Retinex image enhancement algorithm, to obtain the first brightness gain value of each pixel;

a brightness control module, for computing a brightness gain control factor, which is positively correlated with the log average value of the input brightness values, according to the log average value of the input brightness values; and computing the second brightness gain value of each pixel according to the brightness gain control factor and the first brightness gain value; and an image enhancement module, for obtaining an output image by enhancing each pixel of the input image according to the second brightness gain value.

The image enhancement method provided by the present application has the following advantages:

The present application uses a Retinex image enhancement algorithm to enhance the input image, and by using the brightness gain control factor, when the image has low brightness, the first brightness gain value will be greatly compressed, and when the image has high brightness, the first brightness gain value is compressed slightly, so that the brightness gain of the dark image can be reduced, thus the brightness of the output image can be effectively controlled, and the brightness of the output image can be improved and consistent with the real environment.

BRIEF DESCRIPTION OF THE DRAWINGS

By reading the detailed description of the non-limiting embodiment with reference to the following drawings, other features, purpose and advantages of the present application will become more apparent.

DETAILED DESCRIPTION

Figure 1:
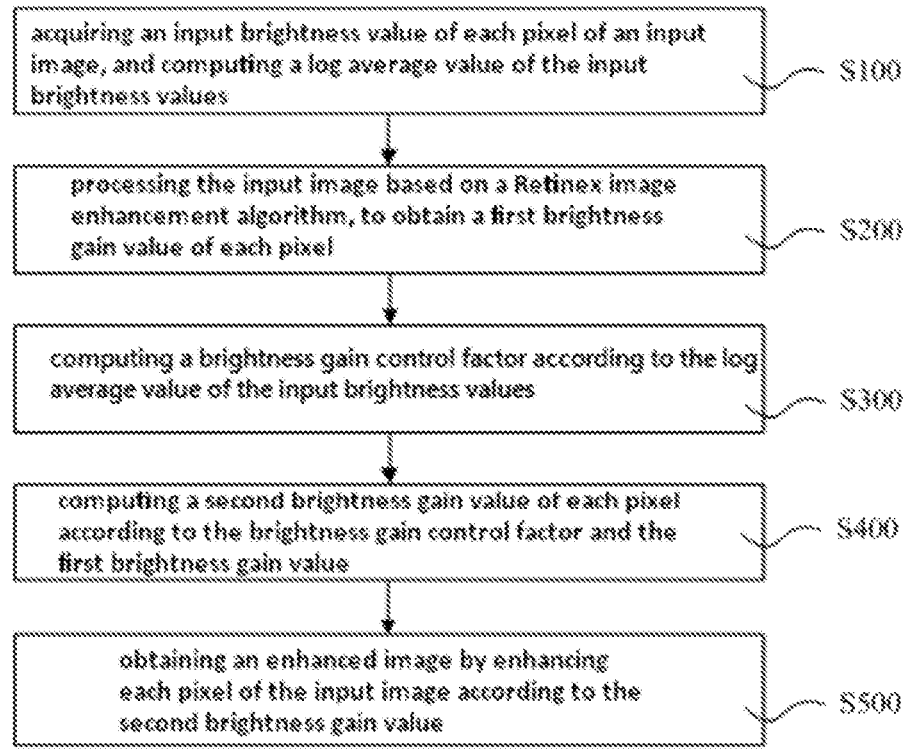
FIG. 1 is a flowchart of an image enhancement method of the present application.

Exemplary implementations will now be described more fully with reference to the accompanying drawings. However, the exemplary implementations can be implemented in a variety of forms and should not be understood to be limited to the implementations set forth herein; instead, providing these implementations makes the present application comprehensive and complete, and fully convey the concept of the exemplary implementation to those skilled in the art. In the figures, the same reference numerals indicate the same or similar structures, so repeated descriptions thereof will be omitted.

As shown in FIG. 1, the present application provides an image enhancement method, comprising the following steps:

S100: acquiring an input brightness value of each pixel of an input image, and computing a log average value of the input brightness values;

S200: processing the input image based on a Retinex image enhancement algorithm, to obtain a first brightness gain value of each pixel;

S300: computing a brightness gain control factor according to the log average value of the input brightness values, the brightness gain control factor is positively correlated with the log average value of the input brightness values;

S400: computing a second brightness gain value of each pixel according to the brightness gain control factor and the first brightness gain value; and S500: obtaining an enhanced image by enhancing each pixel of the input image according to the second brightness gain value.

The present application adopts a Retinex image enhancement algorithm to enhance the input image, and a brightness gain control factor to control the brightness gain. The brightness gain control factor, which depends on a log average value of the input brightness value, can well reflect the overall brightness level of the input image, on the basis of which the brightness gain is controlled accordingly, so that the brightness of the output image can be improved and consistent with the real environment.

In the present application, the Retinex image enhancement algorithm can use a global adaptive algorithm, or a local adaptive algorithm, or a combination of the global adaptive algorithm and the local adaptive algorithm. In addition, other image enhancement algorithms based on Retinex can also be used, and all these algorithms fall into the scope of the present application.

The present application will be described in detail with a specific embodiment as follows. The embodiment is based on the Retinex theory. First, the global tone mapping technology is used to pre-process the input image; then, the local tone mapping is used to process the output after the global processing; then, the output brightness of the Retinex algorithm is normalized; the brightness gain control factor is used to process the output brightness of the Retinex algorithm; finally, the output image is obtained from the processed brightness and input chrominance values.

Figure 2:
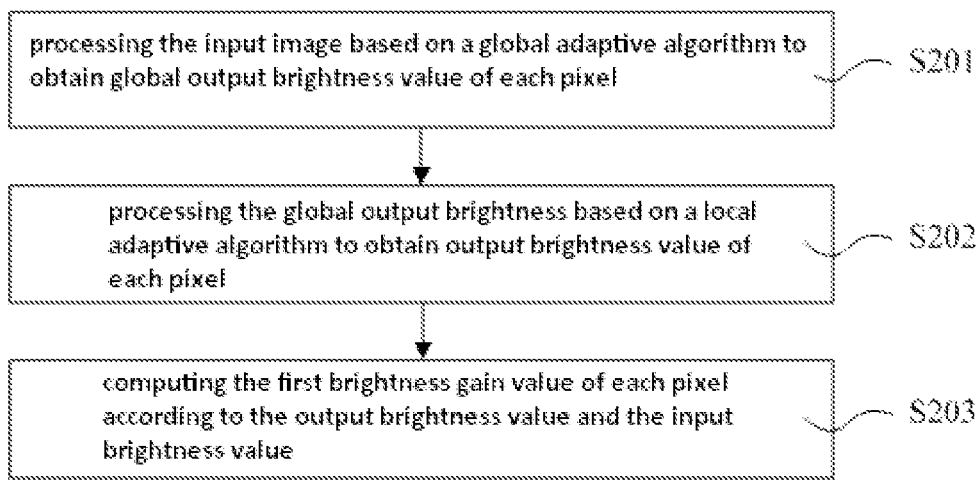
FIG. 2 is a flowchart for computing a first brightness gain value in an embodiment of the present application.

As shown in FIG. 2, in the embodiment, image enhancement includes two parts: global processing and local processing. Specifically, the above step S200 may include the following steps:

S201: processing the input image based on a global adaptive algorithm to obtain a global output brightness value of each pixel;

S202: processing the global output brightness based on a local adaptive algorithm to obtain an output brightness value of each pixel; and S203: computing the first brightness gain value of each pixel according to the output brightness value and the input brightness value.

In addition, in this embodiment, the local adaptive algorithm in step S202 is improved, and the Gaussian filter in the visual algorithm is replaced with a guided filter, which can remove the halo. A contrast enhancement factor based on scene brightness, which is for controlling the contrast of the output image, is added to the local processing algorithm. In addition, the embodiment also introduces the non-linear intensity of the logarithmic function to process the adaptive non-linear offset.

Figure 3:
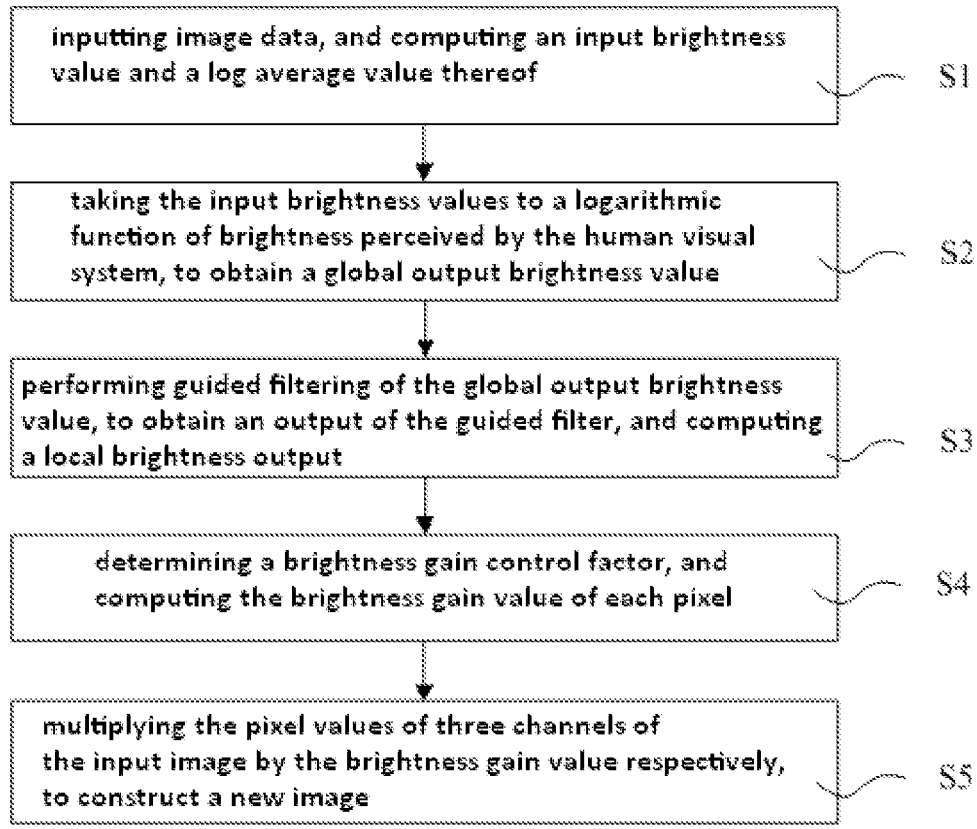
FIG. 3 is a flowchart of an image enhancement method in an embodiment of the present application.

As shown in FIG. 3, the image enhancement method of the embodiment may include the following steps:

S1: inputting image data, and computing an input brightness value $L_w$ and a log average value $\overline{L}_w$ thereof;

S2: taking the input brightness value $L_w$ to a logarithmic function of brightness perceived by the human visual system, to obtain a global output brightness value $L_g$;

S3: performing guided filtering of the global output brightness value $L_g$, to obtain an output $H_g$ of the guided filter, determining a contrast control parameters η and a non-linear control parameters λ, and computing a local brightness output $L_l$;

S4: determining a brightness gain control factor τ, and computing the brightness gain value of each pixel with the input brightness value $L_w$, the log average value $\overline{L}_w$, the local brightness output $L_l$ and brightness gain control factor τ; and S5: multiplying the pixel values of three channels of the input image by the brightness gain value respectively, to construct a new image.

Therefore, using the image enhancement method of the embodiment can not only enhance the contrast and brightness of the output image, but also eliminate halo artifacts. The present application can perform adaptive enhancement for different types of images, ensuring real-time image enhancement.

Each of the steps will be described in detail as follows:

S1. input image data, computing the input brightness value $L_w$ of the input image, and computing the log average value $\overline{L}_w$ according to the following formula:

$$\overline{L}_w = \exp\left(\frac{1}{N}\Sigma_{x,y} \log(\delta + L_w(x, y))\right)$$

wherein, $L_w(x,y)$ is the input brightness value of the pixel (x,y), $\overline{L}_w$ is the log average value of $L_w(x,y)$, N is the total number of pixels of the input image, δ is a second preset control value, and $L_w(x,y)$ is the input brightness value of the pixel (x,y).

S2. Computing the global output brightness value $L_g(x,y)$ according to the global adaptive algorithm.

Global self-adaptation is similar to the early human vision system. The approximation of the brightness perceived by the human vision system is a logarithmic function. Therefore, the conversion formula for the visual global brightness is as follows:

$$L_g(x, y) = \frac{\log(L_w(x, y)/\overline{L}_w + 1)}{\log(L_{wmax}/\overline{L}_w + 1)}$$

wherein, $L_g(x,y)$ is the global output brightness value of the pixel (x,y), $L_w(x,y)$ is the input brightness value of the pixel (x,y), $L_{wmax}$ is the maximum value of $L_w(x,y)$, and $\overline{L}_w$ is the log average value of $L_w(x,y)$.

S3. Computing the local output brightness value $L_l(x,y)$ according to the local adaptive algorithm.

After the global adaptive processing, a local adaptive algorithm based on the visual theory is used. In this embodiment, a guided filter is used instead of the double-edge filter in the traditional theory, both of which are edge-preserving filters, and the guided filter has better performance near the edge. The local adaptive formula is:

$$L_l(x,y) = \log(L_g(x,y)) - \log(H_g(x,y))$$

wherein, $L_g(x,y)$ is the global output brightness value of the pixel (x,y), $H_g(x,y)$ is the output of the guided filter, and $L_l(x,y)$ is the local output brightness value of the pixel (x,y).

Computing the output of the guided filter according to the following formula:

$$H_g(x,y) = \frac{1}{|\omega|} \Sigma_{(\xi_x,\xi_y)\in\omega(x,y)}(a(\xi_x,\xi_y)L_g(x,y) + b(\xi_x,\xi_y))$$

wherein, $\xi_x, \xi_y$ are adjacent coordinates of the pixel (x,y), $\omega(x,y)$ is a local rectangular window at a distance of radius r from the pixel (x,y), $|\omega|$ is the number of pixels in the $\omega(x,y)$, $a(\xi_x,\xi_y)$ and $b(\xi_x,\xi_y)$ are respectively linear coefficients, which may be respectively computed according to the following two formulas:

$$a(\xi_x,\xi_y) = \frac{\mu_2(\xi_x,\xi_y) - \mu^2(\xi_x,\xi_y)}{\sigma^2(\xi_x,\xi_y) + \varepsilon}$$

$$b(\xi_x,\xi_y) = \mu(\xi_x,\xi_y) - a(\xi_x,\xi_y)\mu(\xi_x,\xi_y)$$

wherein, $\mu(\xi_x,\xi_y)$ and $\sigma^2(\xi_x,\xi_y)$ are respectively a mean and a variance of $L_g(x,y)$ in $\omega(\xi_x,\xi_y)$, $\mu_2(\xi_x,\xi_y)$ is a mean of $L_g^2(x,y)$ in $\omega(\xi_x,\xi_y)$, and $\varepsilon$ is a regularization parameter.

After filtering, the halo effect will be significantly reduced, but the global contrast is low. Two important factors are introduced to prevent the flat effect caused by the filter and improve the performance of the algorithm. One factor is a contrast enhancement factor with a formula shown as:

$$\alpha(x,y) = 1 + \eta \frac{L_g(x,y)}{L_{gmax}}$$

The other factor is an adaptive nonlinear offset factor with a formula shown as:

$$\beta = \lambda \overline{L}_g$$

wherein, $L_{gmax}$ is the maximum value of $L_g(x,y)$, $\lambda$ is a non-linear control parameter, and $\overline{L}_g$ is the log average value of $L_g(x,y)$.

Through the computation of the above partial factors, the final local adaptive formula is:

$$L_{out}(x,y) = \alpha(x,y)\log\left(\frac{L_g(x,y)}{H_g(x,y)} + \beta\right)$$

wherein, $L_{out}(x,y)$ is an optimized local output brightness value of the pixel (x,y).

S4. Determining the brightness gain control factor $\tau$.

Normalizing $L_{out}$, so that it is in the same range as the input brightness. The normalization method can use the following formula:

$$L'_{out}(x,y) = \frac{L_{out}(x,y) - L_{outmin}}{L_{outmax} - L_{outmin}}$$

wherein, $L'_{out}(x,y)$ is a normalized brightness value of $L_{out}(x,y)$, and $L_{outmax}$ and $L_{outmin}$ are respectively maximum value and minimum value of $L_{out}(x,y)$.

Computing the first brightness gain value according to the following formula:

$$G(x,y) = \frac{L'_{out}(x,y)}{L_w(x,y)}$$

wherein, $G(x,y)$ is a first brightness gain value of the pixel (x,y).

$G(x,y)$, if directly used as the gain output image, cannot effectively control the output brightness of the image. For darker images, the output image brightness is too high, and the image is not consistent with the actual scene although it looks clearer; especially when the image has poor quality, the output image is accompanied by noise and looks worse.

In order to solve the above problem, it is necessary to control the output brightness so that the output image can be improved and consistent with the real environment. Then it is expected that as the image brightness becomes smaller, the $G(x,y)$ becomes smaller and the gradient becomes greater.

To this end, a brightness gain control factor $\tau$ is conceived, which is adjusted on the basis of $G(x,y)$.

$$G'(x,y) = (G(x,y))^\tau$$

wherein, $\tau$ is the brightness gain control factor, $G(x,y)$ 和 $G'(x,y)$ are respectively the first brightness gain value and the second brightness gain value of a pixel (x,y).

Computing the brightness gain control factor according to the following formula:

$$\tau = (\overline{L}_w)^\varphi$$

wherein, $\overline{L}_w$ is the log average value of the input brightness values, $\tau$ is the brightness gain control factor, $\varphi$ is a first preset control value, and $\varphi \in [0,1]$. In practical applications, the first preset control value can be selected according to empiric values, for example, 0.5, 0.6, etc., to acquire the best brightness gain control effect. In addition, when the value of $\varphi$ is 0, the brightness gain control factor is 1, which has no effect on the first brightness gain value, so the value of $\varphi$ is further preferably selected in the range of (0,1].

The brightness gain control factor $\tau$ takes the log average value of the input brightness as input, which can better reflect the brightness of the original image. $\overline{L}_w$ is the log average value of the input brightness value, and $\overline{L}_w \in [0,1]$, thus $\tau \in [0,1]$.

This is because when the image brightness is low, the first brightness gain value will be greatly compressed, and when the image brightness is large, the first brightness gain value will be compressed to a relatively small extent, thereby controlling the output brightness, to achieve effective control.

S5: enhancing each pixel of the input image according to the following formula, to obtain the output image:

RGB1(x,y)=RGB0(x,y)*G'(x,y)

wherein, G'(x,y) is the second brightness gain value of the pixel (x,y), RGB1(x,y) is a RGB value of the pixel (x,y) in an output image, and RGB0(x,y) is a RGB value of the pixel (x,y) in an input image.

Figure 4:
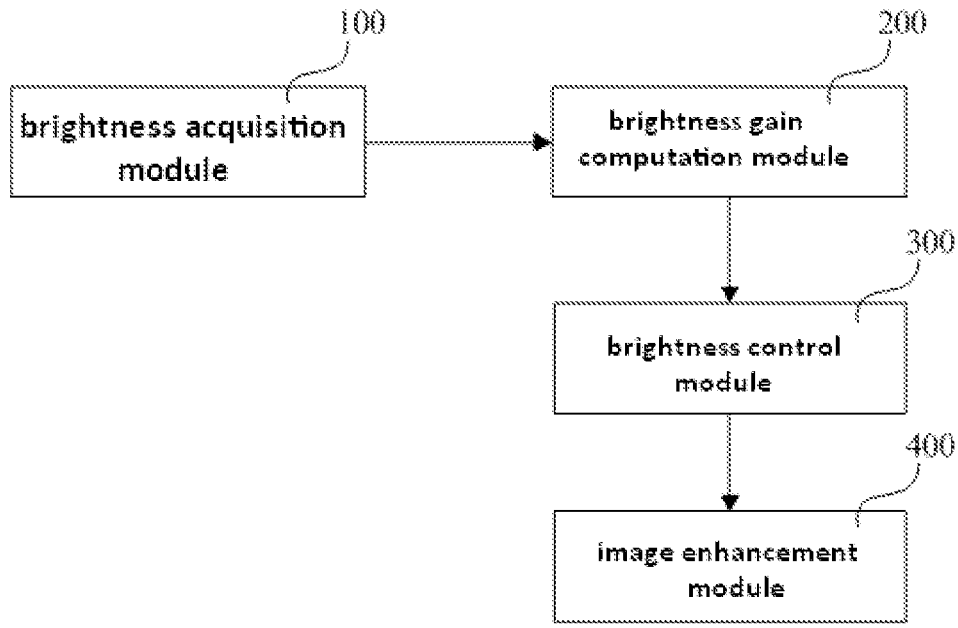
FIG. 4 is a structural diagram for an image enhancement system in an embodiment of the present application.

As shown in FIG. 4, an embodiment of the present application also provides an image enhancement system for implementing the above-mentioned image enhancement method. The system includes an input brightness value acquisition module 100, a brightness gain computation module 200, a brightness control module 300 and an image enhancement module 400, wherein:

The brightness acquisition module 100 acquires the input brightness value of each pixel in the input image; the brightness gain computation module 200 computes the log average value of the input brightness value, and processes the input image based on a Retinex image enhancement algorithm, to obtain first brightness gain value of each pixel; the brightness control module 300 computes a brightness gain control factor according to the log average value of the input brightness values, and computing second brightness gain value of each pixel according to the brightness gain control factor; and the image enhancement module 400 obtains an output image by enhancing each pixel of the input image according to the second brightness gain value.

In this embodiment, the input image is enhanced using the Retinex image enhancement algorithm, and the brightness gain is controlled by using the brightness gain control factor. The brightness gain control factor is determined by the log average value of the input brightness value, which can well reflect the overall brightness level of the input image, and control the brightness gain according to the overall brightness level of the input image, so that the brightness of the output image can be both improved and consistent with the real environment.

Figure 5:
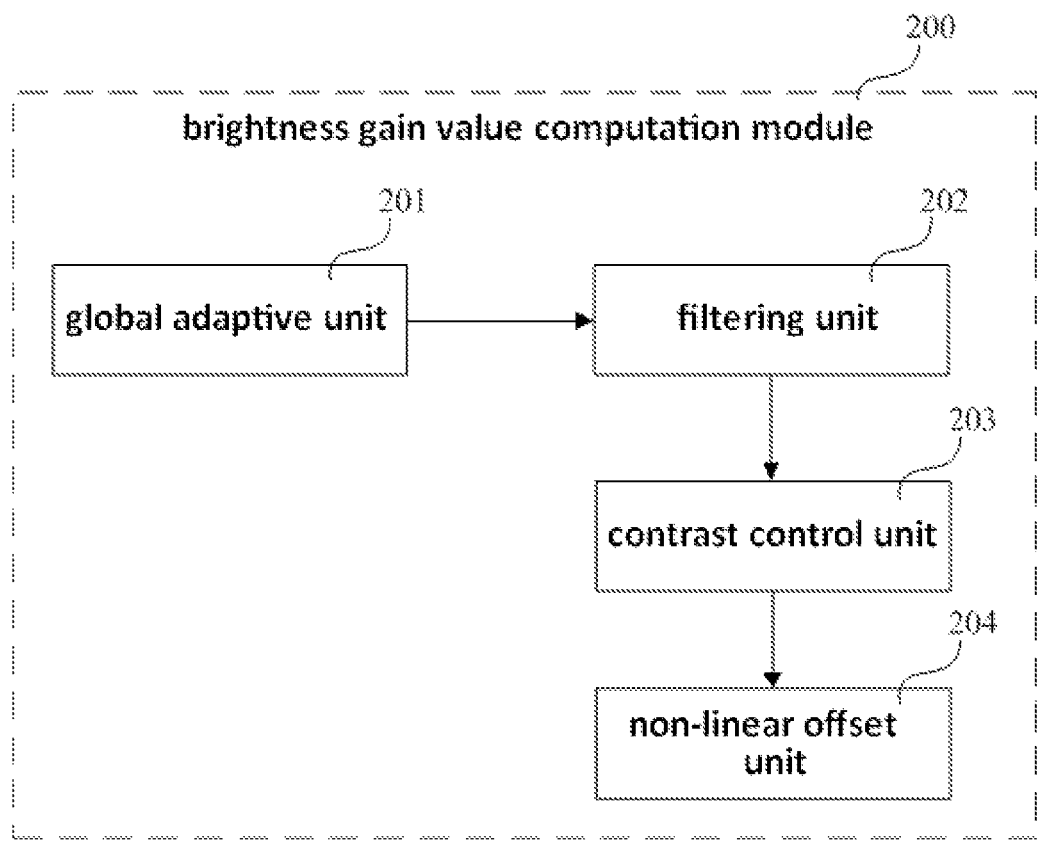
FIG. 5 is a structural diagram for a brightness gain computation module in an embodiment of the present application.

Each module can implement fixed-point processing of the algorithm, and can be implemented in FPGA (Field-Programmable Gate Array, Field Programmable Gate Array). The specific operation steps of each module can refer to the embodiment of the above mentioned image method. As shown in FIG. 5, the brightness gain computation module 200 may further include a global adaptive unit 201 that uses a global adaptive algorithm to process the image to obtain a global output brightness value; a filtering unit 202 that uses a guided filter to filter the global output brightness value; a contrast control unit 203 that computes a contrast enhancement factor, and introduces the contrast enhancement factor into the local adaptive formula; a non-linear offset unit 204 that computes an adaptive nonlinear offset factor, and introduces the adaptive nonlinear offset factor into the local adaptive formula. Therefore, using the image enhancement method of the embodiment can not only effectively control the brightness of the output image, but also reduce the halo effect of the enhanced image through the guided filter, enhance the global contrast of the image through the contrast enhancement factor, and maintain the accuracy of the local adaptive algorithm through the adaptive nonlinear offset factor.

The image enhancement method and system provided by the present application have the following advantages:

The present application uses the Retinex image enhancement algorithm to enhance the input image. With the use of the brightness gain control factor, when the image brightness is low, the first brightness gain value will be greatly compressed, and when the image brightness is large, the first brightness gain value is compressed by a small amount, so that the brightness gain of the dark image can be reduced; thus, the brightness of the output image can be effectively controlled, and the brightness of the output image can be both improved and consistent with the real environment.

The above contents are further detailed description of the present application in combination with specific preferred implementations. It cannot be considered that the specific implementation of the present application is limited to these descriptions. For those with ordinary skills in the technical field to which the present application belongs, a number of simple derivations or replacements can also be made without departing from the concept of the present application, and all of the derivations or replacements should be considered as belonging to the protection scope of the present application.

What is claimed is:

1. An image enhancement method, comprising the following steps:

acquiring an input brightness value of each pixel of an input image, and computing a log average value of the input brightness values;

processing the input image based on a Retinex image enhancement algorithm, to obtain a first brightness gain value of each pixel;

computing a brightness gain control factor, which is positively correlated with the log average value of the input brightness values, according to the log average value of the input brightness values;

computing a second brightness gain value of each pixel according to the brightness gain control factor and the first brightness gain value; and obtaining an output image by enhancing each pixel of the input image according to the second brightness gain value.

2. The image enhancement method of claim 1, wherein, computing the second brightness gain value of each pixel according to the following formula:

$G'(x,y)=(G(x,y))^{\tau}$ wherein, $\tau$ is the brightness gain control factor, $G(x,y)$ and $G'(x,y)$ are respectively the first brightness gain value and second brightness gain value of a pixel (x,y).

3. The image enhancement method of claim 2, wherein, computing the brightness gain control factor according to the following formula:

$\tau=(\overline{L}_w)^{\varphi}$ wherein, $\overline{L}_w$ is the log average value of the input brightness values, $\tau$ is the brightness gain control factor, $\varphi$ is a first preset control value, and $\varphi \in [0,1]$.

4. The image enhancement method of claim 1, wherein, computing the log average value of the input brightness values according to the following formula:

$$\overline{L}_w = \exp\left(\frac{1}{N}\sum_{x,y}\log(\delta + L_w(x,y))\right)$$

wherein, $L_w(x,y)$ is the input brightness value of the pixel (x,y), $\overline{L}_w$ is the log average value of $L_w(x,y)$, N is the total number of pixels of the input image, $\delta$ is a second preset control value, and $L_w(x,y)$ is the input brightness value of the pixel (x,y).

5. The image enhancement method of claim 1, wherein, processing the input image based on a Retinex image enhancement algorithm comprises the following steps:

processing the input image based on a global adaptive algorithm to obtain a global output brightness value of each pixel;

processing the global output brightness based on a local adaptive algorithm to obtain an output brightness value of each pixel; and computing the first brightness gain value of each pixel according to the output brightness value and the input brightness value.

6. The image enhancement method of claim 5, wherein, processing the input image based on a global adaptive algorithm comprises the following steps:

computing the global output brightness value of each pixel according to the following formula:

$$L_g(x, y) = \frac{\log(L_w(x, y)/\overline{L_w} + 1)}{\log(L_{wmax}/\overline{L_w} + 1)}$$

wherein, $L_g(x,y)$ is the global output brightness of the pixel $(x,y)$, $L_w(x,y)$ is the input brightness value of the pixel $(x,y)$, $L_{wmax}$ is a maximum value of $L_w(x,y)$, and $\overline{L_w}$ is the log average value of $L_w(x,y)$.

7. The image enhancement method of claim 5, wherein, processing the global output brightness based on a local adaptive algorithm comprises the following steps:

computing an output value of a guided filter according to the global output brightness of each pixel;

computing a local output brightness value of each pixel according to the following formula:

$$L_l(x,y) = \log(L_g(x,y)) - \log(H_g(x,y))$$

wherein, $L_g(x,y)$ is the global output brightness value of the pixel $(x,y)$, $H_g(x,y)$ is the output value of the guided filter, and $L_l(x,y)$ is the local output brightness value of the pixel $(x,y)$; and taking the local output brightness value as the output brightness value of each pixel.

8. The image enhancement method of claim 5, wherein, processing the global output brightness value based on a local adaptive algorithm comprises the following steps:

computing output value of the guided filter according to the global output brightness value of each pixel;

computing the local output brightness value of each pixel according to the following formula:

$$L_{out}(x, y) = \alpha(x, y)\log\left(\frac{L_g(x, y)}{H_g(x, y)} + \beta\right)$$

wherein, $L_g(x,y)$ is the global output brightness value of the pixel $(x,y)$, $H_g(x,y)$ is the output value of the guided filter, $L_{out}(x,y)$ is the local output brightness value of the pixel $(x,y)$, $\alpha(x,y)$ is a contrast enhancement factor of the pixel $(x,y)$, $\beta$ is an adaptive nonlinear offset factor; and both $\alpha(x,y)$ and $\beta$ may be respectively computed by the following two formulas:

$$\alpha(x, y) = 1 + \eta\frac{L_g(x, y)}{L_{gmax}}$$

$$\beta = \lambda \overline{L_g}$$

wherein, $L_{gmax}$ is a maximum value of $L_g(x,y)$, $\eta$ is a contrast control parameter, $\lambda$ is a non-linear control parameter, and $\overline{L_g}$ is the log average value of $L_g(x,y)$; and taking the local output brightness value as the output brightness value of each pixel.

9. The image enhancement method of claim 7, wherein, computing the output of the guided filter according to the following formula:

$$H_g(x, y) = \frac{1}{|\omega|}\sum_{(\xi_x,\xi_y)\in\omega(x,y)}(a(\xi_x, \xi_y)L_g(x, y) + b(\xi_x, \xi_y))$$

wherein, $\xi_x, \xi_y$ are adjacent coordinates of the pixel $(x,y)$, $\omega(x,y)$ is a local rectangular window at a distance of radius r from the pixel $(x,y)$, $|\omega|$ is the number of pixels in the $\omega(x,y)$, $a(\xi_x,\xi_y)$ and $b(\xi_x,\xi_y)$ are respectively linear coefficients, which may be respectively computed according to the following two formulas:

$$a(\xi_x, \xi_y) = \frac{\mu_2(\xi_x, \xi_y) - \mu^2(\xi_x, \xi_y)}{\sigma^2(\xi_x, \xi_y) + \varepsilon}$$

$$b(\xi_x, \xi_y) = \mu(\xi_x, \xi_y) - a(\xi_x, \xi_y)\mu(\xi_x, \xi_y)$$

wherein, $\mu(\xi_x,\xi_y)$ and $\sigma^2(\xi_x,\xi_y)$ are respectively a mean and a variance of $L_g(x,y)$ in $\omega(\xi_x,\xi_y)$, $\mu_2(\xi_x,\xi_y)$ is a mean of $L_g^2(x,y)$ in $\omega(\xi_x,\xi_y)$, and $\varepsilon$ is a regularization parameter.

10. An image enhancement system, comprising:

an input brightness value acquisition module, for acquiring an input brightness value of each pixel of an input image;

a brightness gain value computation module, for computing a log average value of the input brightness values; and processing the input image based on a Retinex image enhancement algorithm, to obtain a first brightness gain value of each pixel;

a brightness control module, for computing a brightness gain control factor, according to the log average value of the input brightness values; and computing a second brightness gain value of each pixel according to the brightness gain control factor; and an image enhancement module, for obtaining an output image by enhancing each pixel of the input image according to the second brightness gain value.

11. The image enhancement method of claim 8, wherein, computing the output of the guided filter according to the following formula:

$$H_g(x, y) = \frac{1}{|\omega|}\sum_{(\xi_x,\xi_y)\in\omega(x,y)}(a(\xi_x, \xi_y)L_g(x, y) + b(\xi_x, \xi_y))$$

wherein, $\xi_x, \xi_y$ are adjacent coordinates of the pixel $(x,y)$, $\omega(x,y)$ is a local rectangular window at a distance of radius r from the pixel $(x,y)$, $|\omega|$ is the number of pixels in the $\omega(x,y)$, $a(\xi_x,\xi_y)$ and $b(\xi_x,\xi_y)$ are respectively linear coefficients, which may be respectively computed according to the following two formulas:

$$a(\xi_x, \xi_y) = \frac{\mu_2(\xi_x, \xi_y) - \mu^2(\xi_x, \xi_y)}{\sigma^2(\xi_x, \xi_y) + \varepsilon}$$

$$b(\xi_x, \xi_y) = \mu(\xi_x, \xi_y) - a(\xi_x, \xi_y)\mu(\xi_x, \xi_y)$$

wherein, $\mu(\xi_x,\xi_y)$ and $\sigma^2(\xi_x,\xi_y)$ are respectively a mean and a variance of $L_g(x,y)$ in $\omega(\xi_x,\xi_y)$, $\mu_2(\xi_x,\xi_y)$ is a mean of $L_g^2(x,y)$ in $\omega(\xi_x,\xi_y)$, and $\varepsilon$ is a regularization parameter.

* * * * *